(12) United States Patent
Gomi et al.

(10) Patent No.: US 11,891,722 B2
(45) Date of Patent: Feb. 6, 2024

(54) SCREW FEEDER AND FIBER STRUCTURE MANUFACTURING APPARATUS

(71) Applicant: SEIKO EPSON CORPORATION, Tokyo (JP)

(72) Inventors: Katsuhito Gomi, Nagano (JP); Yuki Oguchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 391 days.

(21) Appl. No.: 17/315,392

(22) Filed: May 10, 2021

(65) Prior Publication Data

US 2021/0355604 A1 Nov. 18, 2021

(30) Foreign Application Priority Data

May 12, 2020 (JP) .................. 2020-083824

(51) Int. Cl.
*D01B 9/00* (2006.01)
*B65G 33/08* (2006.01)
*B01F 27/90* (2022.01)
*B01F 27/17* (2022.01)

(52) U.S. Cl.
CPC .............. *D01B 9/00* (2013.01); *B01F 27/90* (2022.01); *B65G 33/08* (2013.01); *B01F 27/17* (2022.01); *D10B 2211/01* (2013.01)

(58) Field of Classification Search
CPC ... D01B 1/32; D01B 1/34; D01B 1/38; D01B 9/00; B65G 33/08; B65G 33/14; B65G 33/38; B01F 27/17; B01F 27/90
USPC .......................................... 19/64.5, 97.5, 105
See application file for complete search history.

(56) References Cited

U.S. PATENT DOCUMENTS

| | | | | | |
|---|---|---|---|---|---|
| 3,114,930 | A | * | 12/1963 | Oldham | B29B 9/02 241/3 |
| 3,572,647 | A | * | 3/1971 | Staheli | B29B 7/845 415/72 |
| 3,843,468 | A | * | 10/1974 | Laakso | D21C 7/06 162/17 |
| 3,849,247 | A | * | 11/1974 | Richter | D21C 7/06 210/415 |
| 4,064,636 | A | * | 12/1977 | Downing | D01B 1/04 134/28 |

(Continued)

FOREIGN PATENT DOCUMENTS

| CN | 105980619 A | 9/2016 |
|---|---|---|
| CN | 108423631 A | 8/2018 |

(Continued)

*Primary Examiner* — Shaun R Hurley
(74) *Attorney, Agent, or Firm* — Global IP Counselors, LLP (57) ABSTRACT

A screw feeder includes: a case that includes a material putting-in portion through which a fluff material is put in and a material putting-out portion through which the fluff material is put out below the material putting-in portion; and a screw that includes a rotational shaft and a blade portion, the rotational shaft being provided rotatably inside the case, the blade portion being spirally mounted on the rotational shaft; wherein the screw is rotated with repeated alternation of a slope-down direction in which the blade portion slopes downward spirally in a vertical direction and a slope-up direction in which the blade portion slopes upward spirally in the vertical direction.

5 Claims, 7 Drawing Sheets

(56) References Cited

U.S. PATENT DOCUMENTS

| | | | | |
|---|---|---|---|---|
| 4,108,063 | A * | 8/1978 | Randolph | B30B 9/3014 |
| | | | | 53/527 |
| 4,836,893 | A * | 6/1989 | Gloersen | D21C 7/00 |
| | | | | 162/243 |
| 5,248,453 | A * | 9/1993 | Ramm | G21F 9/36 |
| | | | | 588/16 |
| 2007/0098862 | A1 * | 5/2007 | Hansen | A22C 7/0084 |
| | | | | 426/512 |
| 2010/0039885 | A1 * | 2/2010 | Baker | B01F 27/091 |
| | | | | 366/195 |
| 2016/0258112 | A1 * | 9/2016 | Gomi | D21F 9/00 |
| 2016/0312405 | A1 | 10/2016 | Murayama et al. | |
| 2016/0332325 | A1 * | 11/2016 | Murayama | D21F 9/00 |
| 2017/0224006 | A1 * | 8/2017 | Seemann | A23P 30/10 |
| 2018/0002213 | A1 * | 1/2018 | Demott | F27D 3/04 |

FOREIGN PATENT DOCUMENTS

| | | |
|---|---|---|
| JP | H05-312627 A | 11/1993 |
| JP | H06-340317 A | 12/1994 |
| JP | H08-151124 A | 6/1996 |
| JP | 2000-202269 A | 7/2000 |
| JP | 2013-100166 A | 5/2013 |
| JP | 2015-172265 A | 10/2015 |

* cited by examiner

SCREW FEEDER AND FIBER STRUCTURE MANUFACTURING APPARATUS

The present application is based on, and claims priority from JP Application Serial Number 2020-083824, filed May 12, 2020, the disclosure of which is hereby incorporated by reference herein in its entirety.

BACKGROUND

1. Technical Field

Embodiments of the present disclosure relate to a screw feeder that supplies a material having low specific gravity, and to a fiber structure manufacturing apparatus based on dry-type fiber processing technology using as little water as possible.

2. Related Art

In related art, when a material that has low bulk density, for example, feathers, is measured, the material is dropped by opening and closing a shutter provided at a bottom portion of a tank filled with the material, and a predetermined amount of the material is measured. Since the shutter is opened and closed manually by an operator, however, it takes a long time to do measurement work, and the amount varies from one to another frequently.

In an attempt to solve these issues, JP-A-5-312627 discloses a technique for measuring a desired amount of feathers accurately in a short time by blowing the feathers onto a net and detecting the amount of the feathers clinging to the net.

JP-A-6-340317 discloses a technique of using a screw feeder in order to transport a powder and granular material inside a casing.

However, although the technique disclosed in JP-A-5-312627 makes it possible to measure a predetermined constant amount of a material at fixed time intervals, it is impossible to transport a constant amount of the material continuously. In the technique disclosed in JP-A-6-340317, when a material that has low bulk density such as feathers is transported, the material is compressed by the blade portion of the screw, and the bulk density changes due to the compression. Therefore, it is impossible to transport a constant amount of the material.

If a constant amount of the material is not transported and therefore if a melting material and a functional material are not mixed with defibrated fibers uniformly, unevenness in the distribution of the melting material and the functional material in a single sheet of a fiber structure (for example, recycled paper) occurs. Because of the uneven distribution, the strength or stiffness of the fiber structure (for example, recycled paper) will be low at some parts locally.

SUMMARY

A screw feeder according to a certain aspect of the present disclosure includes: a case that includes a material putting-in portion through which a fluff material is put in and a material putting-out portion through which the fluff material is put out below the material putting-in portion; and a screw that includes a rotational shaft and a blade portion, the rotational shaft being provided rotatably inside the case, the blade portion being spirally mounted on the rotational shaft; wherein the screw is rotated with repeated alternation of a slope-down direction in which the blade portion slopes downward spirally in a vertical direction and a slope-up direction in which the blade portion slopes upward spirally in the vertical direction.

In the screw feeder according to the above aspect, a length of time of rotating the screw in the slope-up direction may be greater than a length of time of rotating the screw in the slope-down direction.

The screw feeder according to the above aspect may further include a jet ejector that projects a jet of gas to an inside of the case.

The screw feeder according to the above aspect may further include a stirring member that stirs an inside of the case.

In the screw feeder according to the above aspect, a diameter of the blade portion may become larger toward a top.

A fiber structure manufacturing apparatus according to another aspect of the present disclosure includes: a dry defibrator that pulverizes and defibrates a raw material that contains fibers; a transportation unit that transports a defibrated material after defibration by the dry defibrator; a material supply unit that supplies a material to the transportation unit; a fiber structure forming unit that forms a fiber structure from the defibrated material transported by the transportation unit, wherein the material supply unit includes a case that includes a material putting-in portion through which a fluff material is put in and a material putting-out portion through which the fluff material is put out below the material putting-in portion; and a screw that includes a rotational shaft and a blade portion, the rotational shaft being provided rotatably inside the case, the blade portion being spirally mounted on the rotational shaft; wherein the screw is rotated with repeated alternation of a slope-down direction in which the blade portion slopes downward spirally in a vertical direction and a slope-up direction in which the blade portion slopes upward spirally in the vertical direction.

A screw feeder and a fiber structure manufacturing apparatus according to the above aspects of the present disclosure make it possible to continuously transport a constant amount of a material that has low bulk density.

DESCRIPTION OF EXEMPLARY EMBODIMENTS

With reference to the accompanying drawings, embodiments of the present disclosure will now be explained.

Figure 1:
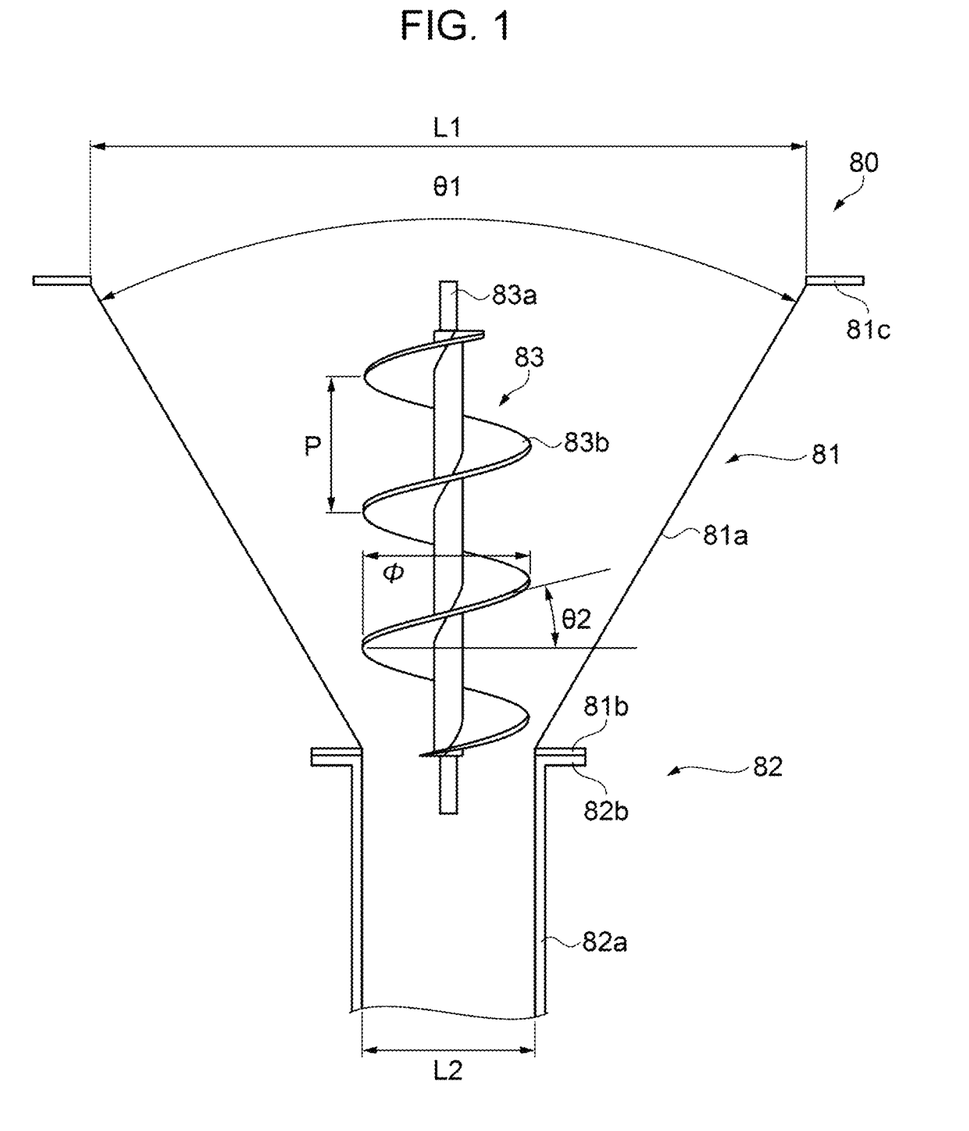
FIG. 1 is a diagram that illustrates a screw feeder according to a first embodiment.
Figure 2:
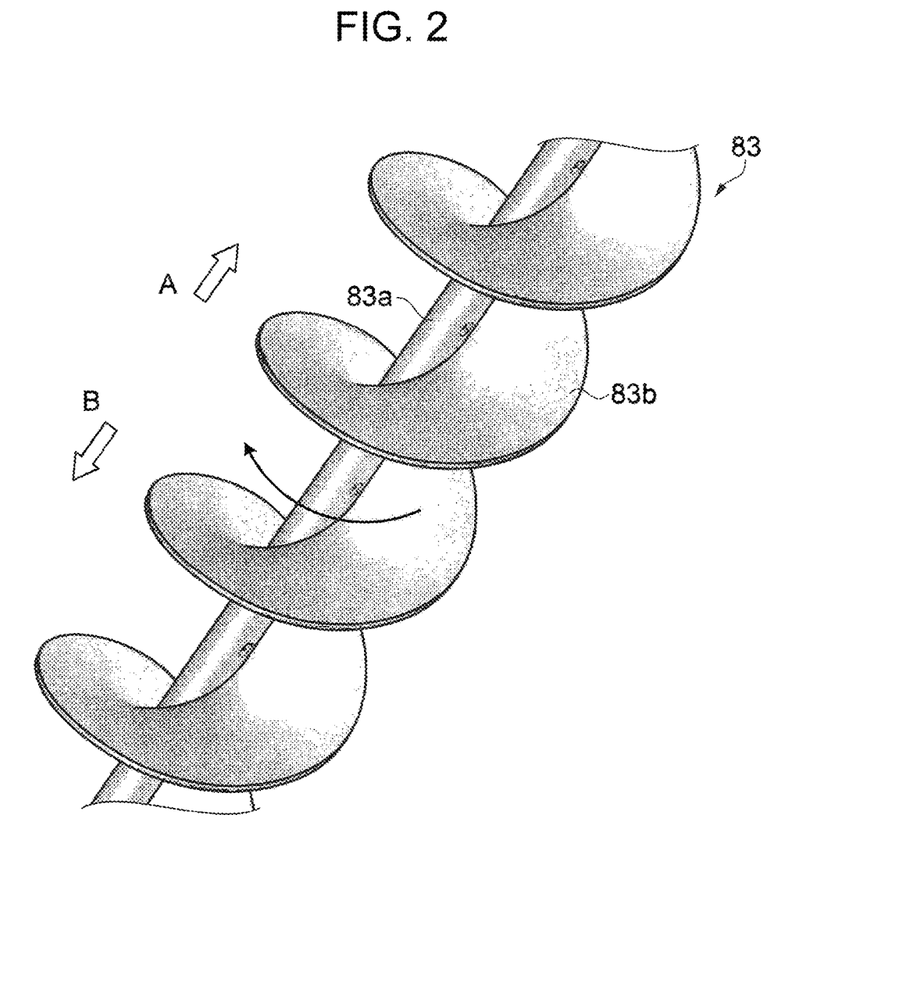
FIG. 2 is a diagram that illustrates a screw of the screw feeder according to the first embodiment.
Figure 3:
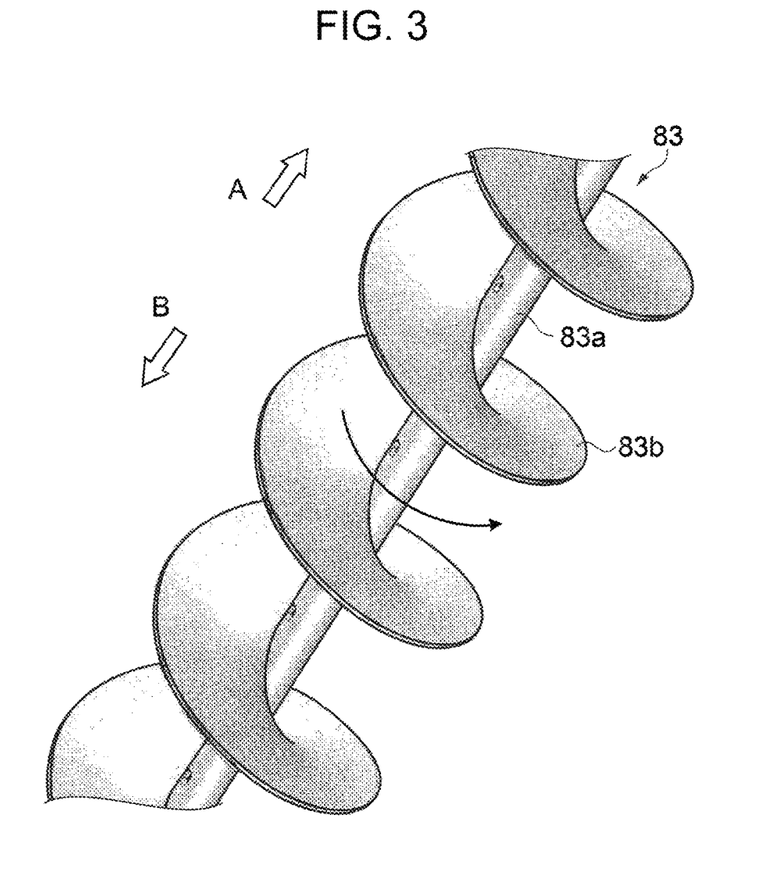
FIG. 3 is a diagram that illustrates a variation example of the screw of the screw feeder according to the first embodiment.

FIG. 1 is a diagram that illustrates a screw feeder 80 according to a first embodiment. FIG. 2 is a diagram that illustrates a screw 83 of the screw feeder 80 according to the first embodiment. FIG. 3 is a diagram that illustrates a variation example of the screw.

The screw feeder 80 according to the first embodiment includes a hopper 81, a material transport pipe 82, and the screw 83. The hopper 81 is a case into which a material is inputted. One end of the material transport pipe 82 is coupled to the hopper 81. A member to which the material is supplied from the screw feeder 80 is coupled to the other end of the material transport pipe 82. The screw 83 is provided rotatably inside the hopper 81. The material transport pipe 82 is not always necessary. That is, the member to which the material is supplied may be directly coupled to the hopper 81.

The hopper 81 includes a hopper body 81a, a material putting-out portion 81b, and a material putting-in portion 81c. The hopper body 81a has a cone shape with a top opening and a bottom opening. The material putting-out portion 81b forms the smaller-diameter-side opening of the hopper body 81a and is coupled to the material transport pipe 82. The material putting-in portion 81c forms the larger-diameter-side opening of the hopper body 81a. The material is put in through the material putting-in portion 81c.

In the present embodiment, the material putting-in portion 81c of the hopper 81 has an opening diameter L1 of 700 mm. However, the diameter L1 may be any value within a range from 300 mm to 1,500 mm approximately. In the present embodiment, the material putting-out portion 81b of the hopper 81 has an opening diameter L2 of 156 mm. However, the diameter L2 may be any value within a range from 56 mm to 506 mm approximately. In the present embodiment, the angle θ1 of the hopper body 81a of the hopper 81 is 60°. However, the angle θ1 may be any value within a range from 30° to 90° approximately.

The hopper body 81a may have any structure as long as it is sloped from the material putting-in portion 81c toward the material putting-out portion 81b so that the material can fall. However, preferably, the hopper body 81a may have a shape of a part of a cone. The material putting-out portion 81b has an opening shape matching with the cross-sectional shape of the material transport pipe 82. Preferably, the opening of the material putting-out portion 81b may be circular. The material putting-in portion 81c may have a structure that includes a side opening that is formed at apart of the upper portion of the hopper body 81a, which has a sloped surface, so that the material can be put in through the side opening. However, preferably, the material putting-in portion 81c may have a circular opening oriented up in the vertical direction.

The material transport pipe 82 includes a pipe body 82a, a hopper coupling portion 82b, which is coupled to the hopper 81, and a non-illustrated supply-side coupling portion, which is coupled to the member to which the material is supplied. The pipe body 82a may have any cross-sectional shape as long as it serves as a pipe. Preferably, the pipe body 82a may have a cylindrical shape.

The screw 83 includes a rotational shaft 83a, which is provided on the line of extension of the central axis of the material transport pipe 82 or in parallel with the line of extension, and a blade portion 83b, which is provided around the rotational shaft 83a.

In the present embodiment, the blade portion 83b of the screw 83 has a helical diameter φ of 150 mm. However, the diameter φ may be any value within a range from 50 mm to 500 mm approximately. In the present embodiment, the blade portion 83b of the screw 83 has a pitch P of 117 mm. However, the pitch P may be any value within a range from 50 mm to 200 mm approximately. In the present embodiment, the blade portion 83b of the screw 83 has a pitch angle θ2 of 22°. However, the pitch angle θ2 may be any value within a range from 15° to 30° approximately. In the present embodiment, the number of revolutions of the screw 83 is 60 rpm. However, the number of revolutions may be any value within a range from 20 rpm to 100 rpm approximately.

The screw 83 is supported by non-illustrated bearings and is driven to rotate by a non-illustrated driver. The direction of rotation of the screw 83 corresponds to a state in which the blade portion 83b is provided.

As illustrated in FIG. 2, when the direction indicated by an arrow A is defined as the direction toward the material putting-in portion 81c of the hopper 81 and when the direction indicated by an arrow B is defined as the direction toward the material transport pipe 82, if the blade portion 83b is provided spirally in such a way as to helically extend clockwise toward the material transport pipe 82 as viewed from the material putting-in portion 81c, or in other words, if the blade portion 83b is provided spirally in such a way as to slope down clockwise as viewed from above in a provided state, the direction of rotation is clockwise as viewed from the material putting-in portion 81c, that is, as viewed from above in the provided state.

As illustrated in FIG. 3, when the direction indicated by the arrow A is defined as the direction toward the material putting-in portion 81c of the hopper 81 and when the direction indicated by the arrow B is defined as the direction toward the material transport pipe 82, if the blade portion 83b is provided spirally in such a way as to helically extend counterclockwise toward the material transport pipe 82 as viewed from the material putting-in portion 81c, or in other words, if the blade portion 83b is provided spirally in such a way as to slope down counterclockwise as viewed from above in a provided state, the direction of rotation is counterclockwise as viewed from the material putting-in portion 81c, that is, as viewed from above in the provided state.

In the present embodiment, the screw feeder 80 according to the first embodiment mainly supplies a fluff material the bulk density of which is within a range from 0.001 $g/cm^3$ to 0.15 $g/cm^3$. For example, the fluff material includes feathers having a bulk density of approximately 0.0026 $g/cm^3$, paper particles having a bulk density of approximately 0.07 $g/cm^3$, and the like. The fluff material may be something like cotton, fibers, etc.

In JP-A-6-340317, in order to transport a powder and granular material, etc., the screw feeder rotates the screw in the direction that is the opposite of the slope direction of the screw blade portion with respect to the direction of transportation.

If the screw feeder rotates the screw as disclosed in JP-A-6-340317, the material is pushed by the screw blade portion, and this pushing function makes it possible to transport a constant amount of the material. However, it does not work well for transporting a constant amount of a fluff material that is intended in the present embodiment. Because of low bulk density of a fluff material, when the fluff material is pushed by the screw blade portion, the fluff material is compressed, resulting in a significant change in density. Moreover, there is a risk of clogging with the fluff material at a position where the width decreases from the hopper 81 toward the material transport pipe 82 in the structure of the present embodiment. Therefore, when a fluff material is transported by the screw feeder 80 having the structure of the present embodiment, it is difficult to transport a constant amount of the fluff material if the screw feeder 80 is rotated as taught in JP-A-6-340317.

To provide a solution, in the present embodiment, the screw 83 of the screw feeder 80 is rotated in the same direction as the direction of the blade portion 83*b* sloping downward spirally in the vertical direction. Since rotation in the direction that is the opposite of the ordinary direction is performed as described above, the fluff material inside the hopper 81 is lifted up by the blade portion 83*b* of the screw 83, is disentangled and is not compressed, and thus becomes easier to fall with the force of gravity smoothly through the clearance between the hopper 81 and the screw 83. Therefore, it is possible to continuously transport an almost constant amount of the material into the material transport pipe 82.

Next, the screw feeder 80 according to a second embodiment will now be explained.

Figure 4:
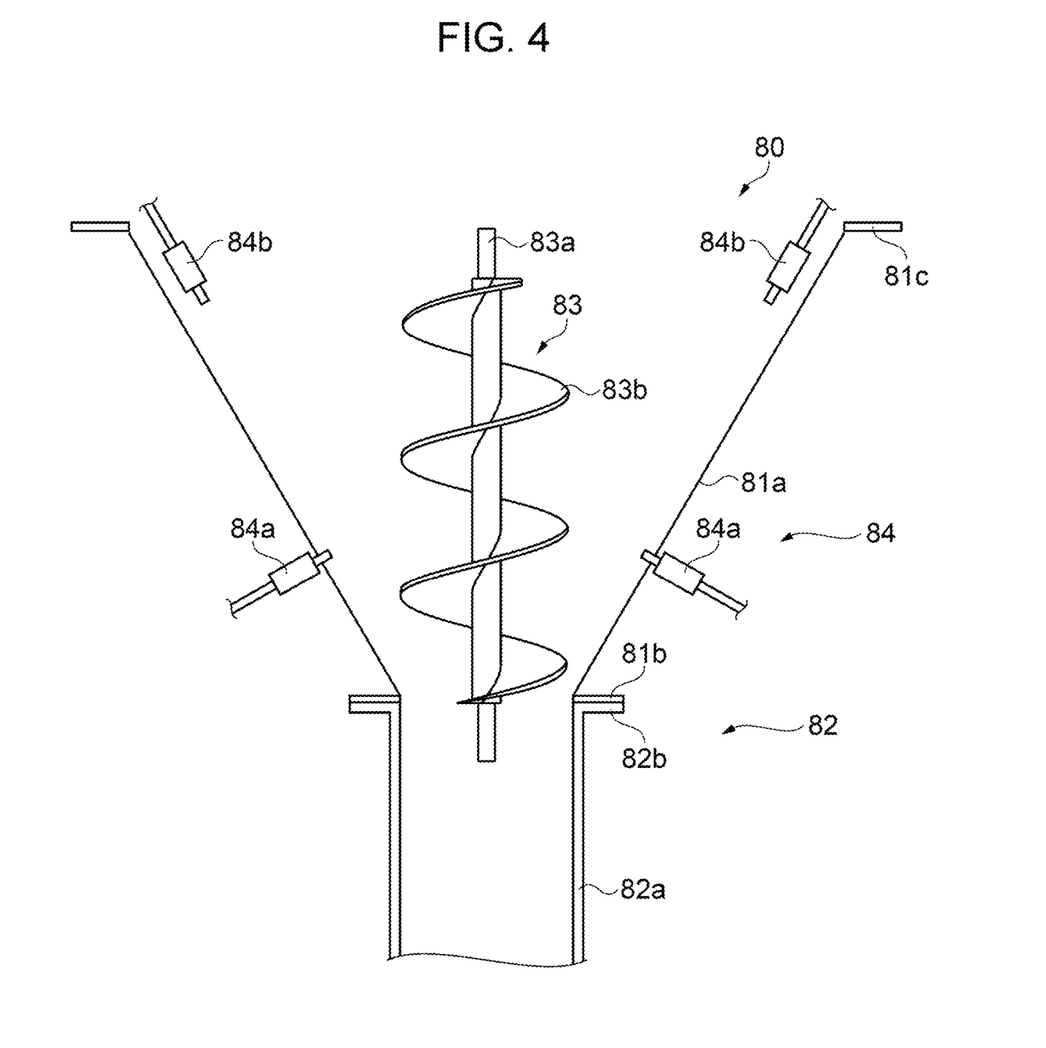
FIG. 4 is a diagram that illustrates a screw feeder according to a second embodiment.

FIG. 4 is a diagram that illustrates the screw feeder 80 according to the second embodiment.

The screw feeder 80 according to the second embodiment is provided with jet ejectors 84 for agitating a fluff material inside the hopper 81. Except for this difference, the structure of the second embodiment is the same as that of the first embodiment. Therefore, an explanation of the same part of the structure is not given here.

The jet ejector 84 is, for example, a component that projects a jet of gas such as a jet of air. The jet ejectors 84 include first gas (air) jet ejectors 84*a*, which are installed by forming holes through the hopper body 81*a*, and second gas (air) jet ejectors 84*b*, which are installed in such a way as to project a jet of gas (air) from the material putting-in portion 81*c*. Either the first gas (air) jet ejector(s) 84*a* only or the second gas (air) jet ejector(s) 84*b* only may be installed, instead of both.

Preferably, the first gas (air) jet ejector 84*a* may project a jet of gas (air) obliquely upward with respect to the horizontal direction from a position below the half height of the hopper body 81*a*. Installing the first gas (air) jet ejector 84*a* in this way and projecting a jet of gas (air) therefrom makes it possible to agitate the fluff material inside the hopper 81, thereby reducing the stay of the stagnant fluff material.

Preferably, the second gas (air) jet ejector 84*b* may project a jet of gas (air) obliquely downward with respect to the horizontal direction from a position above the half height of the hopper body 81*a*. Installing the second gas (air) jet ejector 84*b* in this way and projecting a jet of gas (air) therefrom makes it possible to agitate the fluff material inside the hopper 81, thereby reducing the stay of the stagnant fluff material.

Therefore, the fluff material falls smoothly through the clearance between the hopper 81 and the screw 83, and an almost constant amount of the fluff material is transported into the material transport pipe 82 continuously.

In the present embodiment, the pressure of a jet of gas projected from the jet ejector 84 is 0.15 MPa. However, the pressure may be any value within a range from 0.1 MPa to 0.5 MPa approximately. The jet of gas projected from the jet ejector 84 may be projected continuously without any jet projection stop time. The jet of gas projected from the jet ejector 84 may be projected intermittently with predetermined jet projection stop time. The jet projection from the first gas (air) jet ejector 84*a* and the jet projection from the second gas (air) jet ejector 84*b* may be performed alternately at predetermined intervals.

Next, the screw feeder 80 according to a third embodiment will now be explained.

Figure 5:
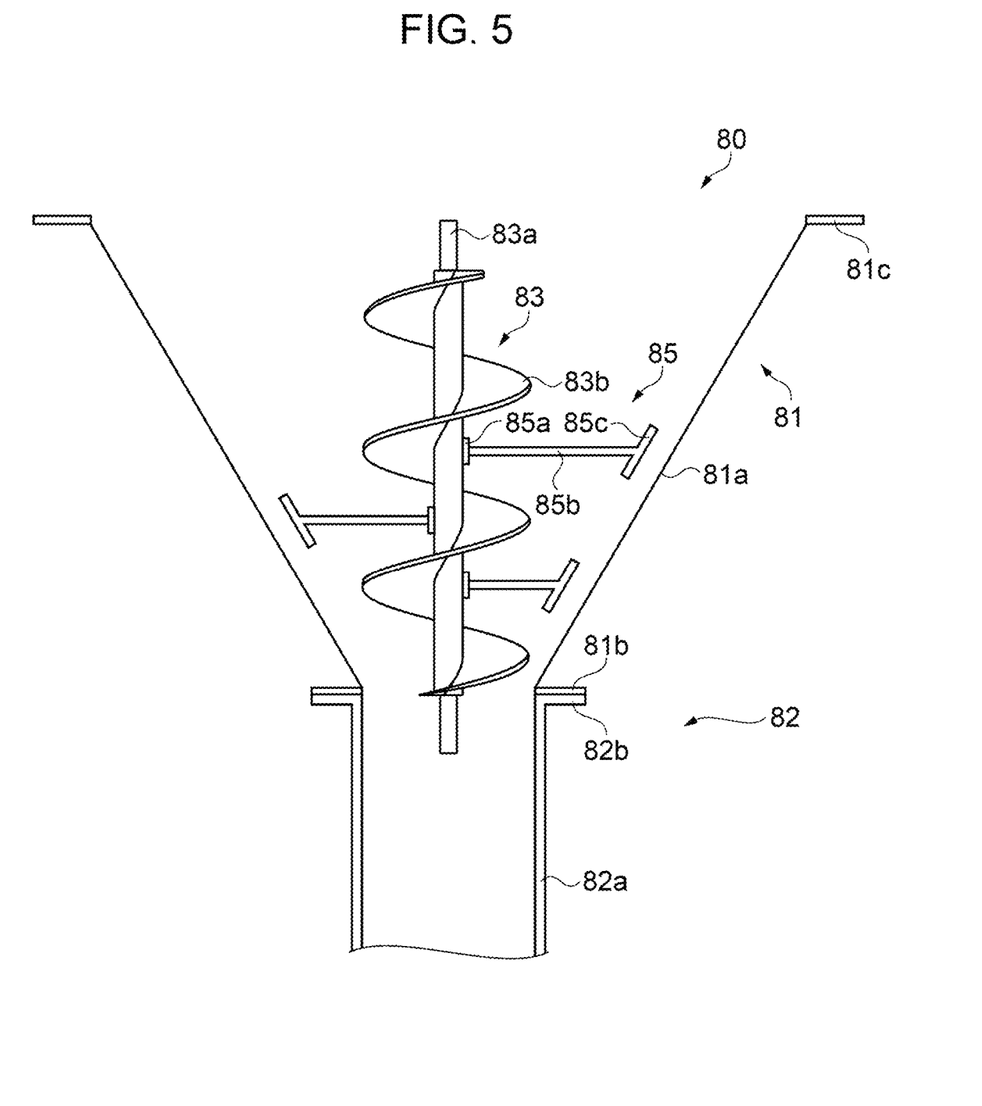
FIG. 5 is a diagram that illustrates a screw feeder according to a third embodiment.

FIG. 5 is a diagram that illustrates the screw feeder 80 according to the third embodiment.

The screw feeder 80 according to the third embodiment is provided with stirring members 85 for stirring a fluff material inside the hopper 81. Except for this difference, the structure of the third embodiment is the same as that of the first embodiment. Therefore, an explanation of the same part of the structure is not given here.

In the present embodiment, the stirring member 85 includes a mount portion 85*a*, which is mounted on the rotational shaft 83*a*, an elongated portion 85*b*, which extends from the mount portion 85*a* toward the hopper body 81*a*, and a protruding portion 85*c*, which protrudes in a direction different from a direction in which the elongated portion 85*b* extends. The stirring member 85 is not limited to a rod-like member. The stirring member 85 may be a plate-like member.

In the present embodiment, the stirring members 85 are mounted on the rotational shaft 83*a* of the screw 83 and rotate together with the screw 83. The stirring member 85 does not necessarily have to rotate together with the screw 83. The stirring member 85 may be configured to move by being driven by a non-illustrated driver that is not the screw 83. The stirring member 85 may rotate in a direction different from the direction of rotation of the screw 83. For example, the stirring member 85 may rotate in the opposite direction. The stirring member 85 may rotate at the number of revolutions different from that of the screw 83.

The stirring member 85 is mounted on the rotational shaft 83*a* in such a way as to protrude toward the opposite side, away from the blade portion 83*b*. The stirring member 85 does not necessarily have to be mounted on the rotational shaft 83*a*. For example, the stirring member 85 may be provided in such a way as to protrude from the hopper body 81*a*. Alternatively, the stirring member 85 may be provided in such a way as to protrude from the blade portion 83*b*.

The stirring members 85 having the structure described above rotate together with the screw 83 to stir the fluff material inside the hopper 81. Installing the stirring members 85 in this way and stirring the fluff material makes it possible to reduce the stay of the stagnant fluff material.

Therefore, the fluff material falls smoothly through the clearance between the hopper 81 and the screw 83, and an almost constant amount of the fluff material is transported into the material transport pipe 82 continuously.

Next, the screw feeder 80 according to a fourth embodiment will now be explained.

Figure 6:
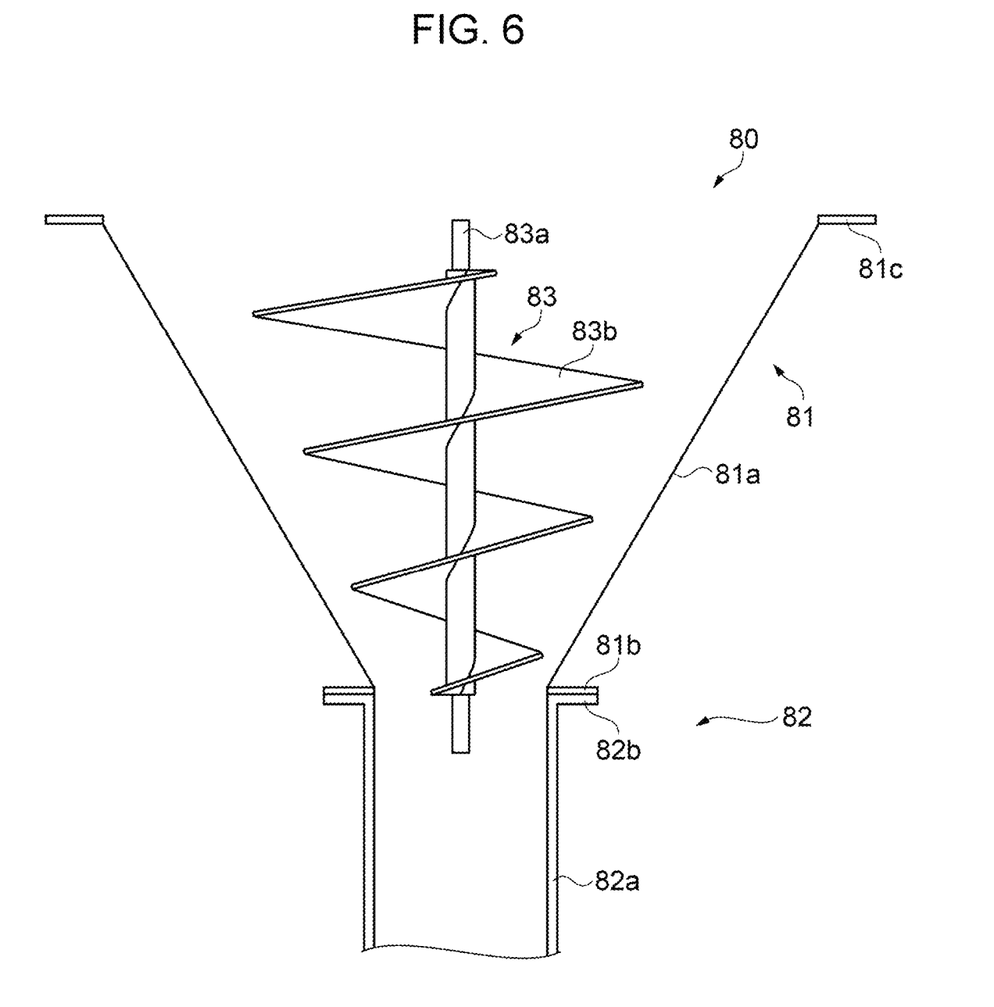
FIG. 6 is a diagram that illustrates a screw feeder according to a fourth embodiment.

FIG. 6 is a diagram that illustrates the screw feeder 80 according to the fourth embodiment.

In the screw feeder 80 according to the fourth embodiment, the outer diameter of the blade portion 83*b* of the screw 83 becomes larger toward the top inside the hopper 81. Except for this difference, the structure of the fourth embodiment is the same as that of the first embodiment. Therefore, an explanation of the same part of the structure is not given here.

In the present embodiment, the blade portion 83*b* is mounted on the rotational shaft 83*a* of the screw 83 and rotates together with the screw 83. Since the outer diameter of the blade portion 83*b* becomes larger toward the top, inside the hopper 81, the number of pieces of the fluff material located on the blade portion 83*b* increases. This makes it possible to reduce the stay of the stagnant fluff material.

Therefore, the fluff material falls smoothly through the clearance between the hopper 81 and the screw 83, and an almost constant amount of the fluff material is transported into the material transport pipe 82 continuously. In the present embodiment, the angle formed by the hopper body 81a and the edge of the blade portion 83b is 10°. However, the angle may be any value within a range from 0° to 30° approximately.

Next, a fiber structure manufacturing apparatus using a screw feeder according to an exemplary embodiment of the present disclosure will now be explained.

Figure 7:
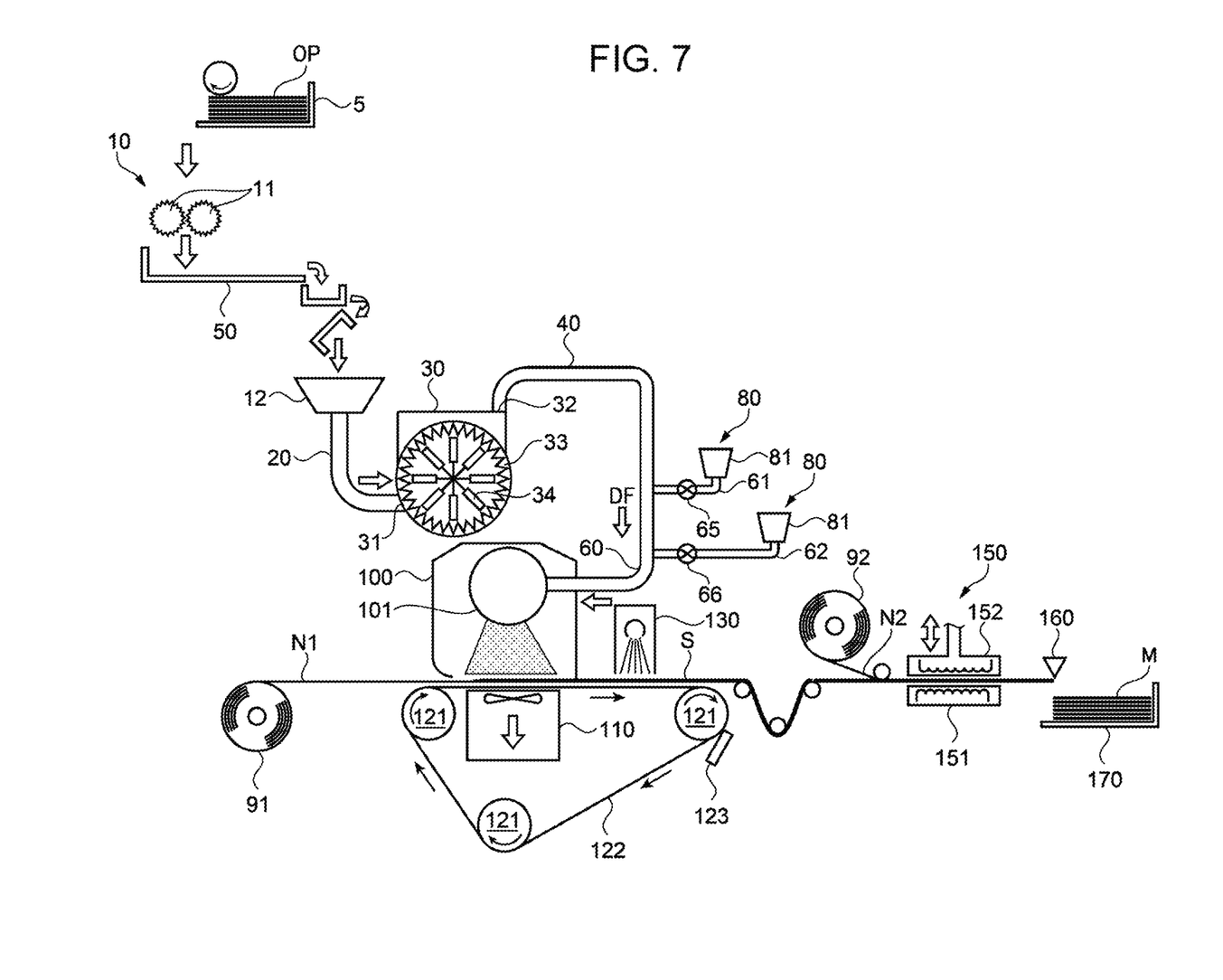
FIG. 7 is a schematic diagram illustrating a schematic configuration of a fiber structure manufacturing apparatus according to an exemplary embodiment of the present disclosure.

FIG. 7 is a schematic diagram illustrating a schematic configuration of a fiber structure manufacturing apparatus using a screw feeder according to an exemplary embodiment of the present disclosure.

The fiber structure manufacturing apparatus according to the present embodiment is based on a recycling technique of, for example, reproducing a new fiber structure such as recycled paper from a fiber material containing fibers such as waste paper through a dry process using as little water as possible.

A manufactured fiber structure can be used as sound-absorbing materials, which absorb sound, and cushioning materials (packing materials), which absorb external shock. The fiber structure functioning as a sound-absorbing material, when provided inside various home appliances, for example, is able to reduce leakage of operating noise to the outside of the appliances. The uses of the fiber structure are not limited to home appliances. For example, the fiber structure can be used also for various construction materials, or sound-absorbing materials to be installed in concert halls for acoustic control, etc.

What is mainly expected to be used as a fiber-containing sheet material OP (for example, waste paper) to be supplied to the fiber structure manufacturing apparatus according to the present embodiment is office waste paper whose recycling routes are yet to be sufficiently established, for example, general waste paper of A4 size, which is currently widely used in offices, confidential office document waste paper, etc. However, not only such office waste paper but also corrugated cardboard and newspaper can be used. When such a sheet material OP (for example, waste paper) containing fibers is put into a coarse crusher 10 of the fiber structure manufacturing apparatus, the sheet material OP containing fibers is shredded into pieces of several centimeters square by coarse crushing blades 11 of the coarse crusher 10. The coarse crusher 10 having such a shredding function may be preferably equipped with an automatic feed mechanism 5 for continuously inputting the sheet material OP containing fibers. With productivity considered, the higher the input speed of the automatic feed mechanism 5, the better.

The coarse crushing blades 11 of the coarse crusher 10 may be configured as a device whose cutting width is made greater in comparison with the blades of a common shredder. Coarsely crushed pieces (paper pieces) after shredding into the size of several centimeters square by the coarse crushing blades 11 may be supplied to a defibrating process, which is a subsequent process, via a metering feeder 50, a hopper 12, and a coarsely crushed piece (paper piece) inlet pipe 20.

The metering feeder 50 may use any method as long as a fixed amount of a material is put into a defibrator. A vibrating feeder is a preferred example.

A vibrating feeder tends to fail to transport a constant amount of pieces of paper that is light in weight due to the effect of, for example, static electricity. Therefore, preferably, pieces of paper that is light in weight may be formed into a block-like shape by performing multi-feeding at the coarse crusher 10 in the preceding process. The weight of each block may be preferably 0.5 g to 2 g.

Coarsely crushed pieces may be continuously supplied from the coarse crusher 10 to the vibrating feeder or may be temporarily stored in a flexible container bag and then supplied therefrom to the vibrating feeder. In the latter case, the flexible container bag functions as a buffer, and thus it is possible to reduce the influence of fluctuations in the amount of collected waste paper on the manufacturing apparatus. Preferably, an amount of coarsely crushed pieces supplied from the flexible container bag should be enough for continuous production for about one hour or so, although it depends on the amount of production. If a large amount of coarsely crushed pieces are supplied from the flexible container bag to the vibrating feeder at a time, the vibration of the vibrating feeder will be affected; therefore, it will be advantageous if coarsely crushed pieces are put in from the flexible container bag little by little. Examples of a method for putting the coarsely crushed pieces in little by little include tilting the flexible container bag, shaking the flexible container bag by means of, for example, a motor, and prodding a part of the flexible container bag with an air cylinder.

The coarsely crushed piece (paper piece) inlet pipe 20 is in communication with an inlet 31 of a dry defibrator 30. The coarsely crushed pieces (paper pieces) fed into the dry defibrator 30 through the inlet 31 are defibrated between a rotating rotor 34 and a stator 33. The dry defibrator 30 has a mechanism for generating a flow of air. Fibers defibrated in a gaseous atmosphere (for example, in air) are carried by such airflow from an outlet 32 to a transport pipe 40.

A specific example of the dry defibrator 30 will now be described. For example, a disc refiner, a turbo mill (manufactured by FREUND-TURBO CORPORATION), a Ceren Miller (manufactured by MASUKO SANGYO CO., LTD), or a dry wastepaper defibrator including a wind generating mechanism such as one disclosed in JP-A-6-93585, etc. can be used as the dry defibrator 30. The size of the coarsely crushed pieces (paper pieces) put into such a dry defibrator 30 may be the general size of shredded pieces of paper outputted from a common shredder. In consideration of the strength of a manufactured fiber structure, preferably, the coarsely crushed pieces (paper pieces) have a long fiber length. However, if coarsely crushed pieces (paper pieces) are excessively large, it will be difficult to put them into the dry defibrator 30. Therefore, it is better that the coarsely crushed pieces (paper pieces) discharged from the coarse crusher 10 have shredded size of several centimeters square.

In the dry defibrator 30 including a wind generating mechanism, coarsely crushed pieces (paper pieces) are sucked in through the inlet 31 by using an airflow self-generated by the dry defibrator 30, together with the airflow, and are then defibrated and transported toward the outlet 32. The dry defibrator 30 defibrates inputted coarsely crushed pieces (paper pieces) into cotton-like form.

For example, an Impeller Mill 250 (manufactured by Seishin Enterprise Co., Ltd.), which is a turbo-mill-type impeller mill, is capable of generating an airflow having an airflow volume of approximately 3 $m^3$/min at 8,000 rpm (peripheral speed of approximately 100 m/s) by using twelve blades installed at the outlet side. In this case, the airflow velocity at the part closer to the inlet 31 is approximately 4 m/s, and coarsely crushed pieces (paper pieces) are carried into the dry defibrator 30 by the airflow. The coarsely crushed pieces (paper pieces) carried into the dry defibrator 30 are defibrated between the blades rotating at high velocity and the stator 33 and are then discharged from the outlet 32. The discharge velocity is approximately 6.5 m/s for a discharge pipe diameter of φ100.

If the dry defibrator 30 that does not include a wind generating mechanism is used, a blower, etc. configured to generate a flow of air that guides coarsely crushed pieces (paper pieces) into the inlet 31 is provided separately.

In the defibrating process by the dry defibrator 30, it is preferable to defibrate pulp into fibrous form until coarsely crushed pieces (paper pieces) lose their shape because such shape-losing defibration eliminates unevenness of the fiber structure to be formed in a subsequent process. In this process, for example, printed ink or toner, and coating and additive materials for paper (papermaking chemicals), such as a bleed prevention agent, are also pulverized into grains of several tens of micrometers or less (hereinafter referred to as ink grains and papermaking chemicals). Therefore, the outputs from the dry defibrator 30 are fibers, ink grains, and papermaking chemicals obtained by defibrating the coarsely crushed pieces (paper pieces).

If, for example, a disc refiner is used as the dry defibrator 30, it is preferable to form blades at the circumferential edge thereof in addition to rotary blades formed on the disc-shaped surface thereof in the radial direction. The gap between the rotary blades on the rotor 34 and the stationary blades on the stator 33 is preferably kept to be approximately equal to the thickness of a paper piece, for example, approximately 100 to 150 μm. With this configuration, the defibrated material is moved to the outer circumference by the flow of air generated by the rotary blades and is discharged from the outlet 32.

The defibrated material (defibrated fibers DF) discharged from the dry defibrator 30 (φ100, sectional area of approximately 78 cm$^2$) is sent to a fiber structure forming machine 100 through the transport pipe 40 and a transport pipe 60.

A melting-material transport pipe 61 is provided as a branch pipe branching off from the transport pipe 60.

A melting material is put in from a hopper 81 of a first material supply apparatus 80. The amount of the melting material is controlled by a melting-material control valve 65. The melting material is supplied to the transport pipe 60 through the melting-material transport pipe 61 and can be mixed into the defibrated fibers DF transported through the transport pipe 60. The accuracy of the amount of the melting material to be transported can be increased by controlling the opening degree of the valve by measuring, with a scale on which a feeder is placed, a reduced amount of the melting material.

The pipe diameter of the melting-material transport pipe 61 may be preferably smaller than the pipe diameter of the transport pipe 60. This is because the velocity of the airflow increases and it becomes easier for the melting material to disperse in the airflow.

The melting material maintains the strength of the fiber structure as a formed product produced from the defibrated fibers DF and contributes to preventing dispersion of paper dust and fibers. The melting material is added to the defibrated fibers DF and is fusion-bonded to the defibrated fibers DF by being heated. The melting material may be any material, such as fibrous materials or powder materials, as long as the material is melted by a heating process. However, materials that melt at 200° C. or lower are preferred examples because, for example, paper yellowing does not occur. Materials that melt at 160° C. or lower are more preferred examples in terms of energy.

The melting material may preferably contain a thermoplastic resin that melts during heat forming. Fibrous melting materials that are easily intertwined with defibrated cotton fibers will be advantageous for producing low-density products. Preferably, composite fibers having a core-in-sheath structure may be used. Melting materials having a core-in-sheath structure are preferable because a sheath portion exhibits an adhesive function when melted at a low temperature and because a core portion remains in fibrous form to retain the shape of the core portion. It is preferable to use, for example, ETC and INTACK series, which are manufactured by ES FIBERVISIONS, Inc., or Tetoron (registered trademark), which is a polyester fiber for dry nonwoven fabric and is manufactured by TEIJIN FIBERS LIMITED.

The fineness of each melting fiber may be preferably 0.5 dtex or more and 2.0 dtex or less. If the fineness of each melting fiber is more than 2.0 dtex, it is not possible to achieve sufficient adhesive strength between a first sheet (a second sheet) and a defibrated-cotton sheet (accumulated fibrous web). If the fineness of each melting fiber is less than 0.5 dtex, for example, problems may arise in that, in fiber manufacture, the position of a core deviates from the center of a sheath in a core-in-sheath structure, and it is difficult to discharge the fibers linearly. Another problem is that, because of a smaller diameter than the defibrated fibers, it is more susceptible to the effect of static electricity, and the melting fibers and the defibrated fibers will be mixed unevenly during the manufacturing process. Regarding the reason why the fineness of each melting-resin fiber should preferably be 2.0 dtex or less, a more detailed explanation will be given later.

The length of each melting-resin fiber may be preferably about 1 to 10 mm. If the length of each melting-resin fiber is less than 1 mm, it is difficult to retain the shape of the fiber structure due to insufficient adhesive strength. If the length of each melting-resin fiber is greater than 10 mm, fibers will be formed into balls in airflow, resulting in poorer dispersion of the fibers.

A functional-material transport pipe 62 is provided as a branch pipe branching off from the transport pipe 60 under the melting-material transport pipe 61 branching off from the transport pipe 60. A powder fire retardant is preferably usable in the product. The amount of the powder fire retardant as a functional material put in from a hopper 81 of a second material supply apparatus 80 is controlled by a functional-material control valve 66. The powder fire retardant is supplied to the transport pipe 60 through the functional-material transport pipe 62 and is transported through the transport pipe 60. With this configuration, it is possible to mix the powder fire retardant into the defibrated fibers DF into which the melting material has been mixed. The accuracy of the amount of the powder fire retardant to be transported can be increased by controlling the opening degree of the valve by measuring, with a scale on which a feeder is placed, a reduced amount of the powder fire retardant.

The pipe diameter of the functional-material transport pipe 62 may be preferably smaller than the pipe diameter of the transport pipe 60. This is because the velocity of the airflow increases and it becomes easier for the functional material to disperse in the airflow.

The fire retardant is added to impart incombustibility to the defibrated-cotton sheet (accumulated fibrous web) formed from the defibrated fibers. For example, hydroxides such as aluminum hydroxide and magnesium hydroxide, boric acid, boric acid compounds such as ammonium borate, phosphorus-based organic materials containing, for example, ammonium polyphosphate or phosphoric esters, or nitrogenous compounds such as melamine and isocyanurate are usable for the fire retardant. Among them, it is preferable to use a composite containing melamine and phosphoric acid.

Preferably, the fire retardant may be a solid fire retardant. The average particle diameter of the solid fire retardant may be preferably 1 µm or more and 50 µm or less. If the average particle diameter is less than 1 µm, transportation by airflow will become difficult when the defibrated fibers DF are accumulated so as to form a defibrated-cotton sheet (fibrous web) (S) in a suction process that is to be performed later. If the average particle diameter is greater than 50 µm, the adhesive power of the solid fire retardant to fibers is reduced, and thus the solid fire retardant is likely to come off the fibers. As a result, the solid fire retardant is distributed unevenly and cannot provide sufficient fire retardancy.

The defibrated fibers DF into which the melting material and the functional material have been mixed through the transport pipe 60 are fed into the fiber structure forming machine 100.

In the fiber structure forming machine 100 according to the present embodiment, the screw feeder 80 disclosed in the first to fourth embodiments is used as the first, second material supply apparatus 80 described above.

For example, a melting material is put into the hopper 81 from the material putting-in portion 81c of the screw feeder 80 illustrated in FIG. 1 as an example of the first material supply apparatus 80 described above. Then, the screw 83 of the screw feeder 80 is rotated in the same direction as the direction of the blade portion 83b sloping downward spirally in the vertical direction. Since rotation in the direction that is the opposite of the ordinary direction is performed, the melting material inside the hopper 81 is lifted up by the blade portion 83b of the screw 83, is disentangled and is not compressed, and falls smoothly through the clearance between the hopper 81 and the screw 83, resulting in continuous transportation of an almost constant amount of the melting material into the material transport pipe 82 (the melting-material transport pipe 61). The material transport pipe 82 is connected to the transport pipe 60. The melting material transported into the transport pipe 60 from the material transport pipe 82 is mixed with the defibrated fibers DF transported through the transport pipe 60.

Similarly to the melting material, a functional material (for example, a flame-retardant substance) that is in the form of powder or fibers is put into the hopper 81 from the material putting-in portion 81c of the screw feeder 80 illustrated in FIG. 1 as an example of the second material supply apparatus 80 described above, and is supplied and transported similarly using the screw 83 of the screw feeder 80.

The first sheet (N1) is supplied from a first sheet supply roller 91 to the fiber structure forming machine 100. The first sheet (N1) supplied from the first sheet supply roller 91 serves as a base for a bottom surface (first surface) of the defibrated-cotton sheet (fibrous web) formed by the fiber structure forming machine 100.

Both woven fabric and nonwoven fabric can be used as the first sheet (N1) in the present disclosure as long as the first sheet (N1) is permeable to air. The first sheet (N1) is required to have air permeability so that an airflow generated by a suction device 110 can act through the first sheet (N1) and so that the defibrated material (defibrated fibers DF), the melting material, and the functional material that are mixed on the first sheet (N1) can therefore accumulate thereon properly. Due to the suction, the additives in waste paper and the print ink grains pulverized by the dry defibrator 30 are removed from the mixed defibrated material. The size of the mesh opening of the first sheet (N1) may be preferably 100 µm or less. The first sheet may be colored because it constitutes an exterior portion of the product. In the present embodiment, ecule (registered trademark) 3151A, which is a polyester filament nonwoven fabric manufactured using a spunbonding method by TOYOBO CO., LTD., is used as the first sheet (N1) having air permeability.

The fiber structure forming machine 100 will now be schematically described. The fiber structure forming machine 100 includes a dispersion mechanism configured to uniformly disperse defibrated fibers in, for example, air, and a suction mechanism configured to suck the dispersed defibrated fibers DF onto a mesh belt 122.

The dispersion mechanism includes a forming drum. The mixed defibrated material and mixed gas (mixed air) are simultaneously supplied into the forming drum 101 that rotates. A small-hole screen is provided on a surface of the forming drum 101. The defibrated fibers DF into which the melting material and the functional material have been mixed are discharged from the small-hole screen. The opening diameter of the drum mesh depends on the size of the mixed defibrated material. The shape of the opening may be a circular shape. Preferably, each opening may be an elongated hole of approximately 5 mm×25 mm to achieve both productivity and uniformity.

The defibrated material, the melting material, and the functional material are uniformly mixed with the mixed gas (mixed air) and pass through the holes of the forming drum 101.

Current plates capable of adjusting uniformity in the width direction are provided below the forming drum. The mesh belt 122, which is an endless belt and on which a mesh stretched between tension rollers 121 is formed, is provided below the current plates. Transport gas (transport air) and mixed gas (mixed air) are sucked through a suction box. The amount of suction gas is set to be larger than the sum of the amount of the transport gas and the amount of the mixed gas. By this means, it is possible to prevent materials and paper dust generated during defibration from being blown off. Since fine powders (waste powders) having passed through the first sheet (N1) and the mesh transportation belt are mixed in the suction gas (suction air), it is preferable to provide a cyclone or a filter dust collector downstream in order to separate the fine powders (waste powders) therefrom.

The mesh belt 122 is configured to move in the direction indicated by the arrows in the figure by drive rotation of at least one of the tension rollers 121 under the fiber structure forming machine 100. Dust, etc. on a surface of the mesh belt 122 is removed by a cleaning blade 123, which is in contact with the mesh belt 122. The mesh belt 122 may be cleaned using air.

The mesh belt 122 may be made of any material such as metal or resin as long as a sufficient amount of suction air is able to pass through the mesh belt 122 and in addition as long as the mesh belt 122 has sufficient strength to hold materials. If the hole diameter of the mesh is excessively large, a surface of the defibrated-cotton sheet (fibrous web) (S) will be formed into an irregular surface shape. In order to avoid such surface irregularities, the hole diameter of the mesh is preferably approximately 60 µm to 125 µm. If the hole diameter of the mesh is less than 60 µm, it is difficult to form a stable flow of air by the suction device 110.

The first sheet (N1) is supplied onto the mesh belt 122 from the first sheet supply roller 91 at a moving velocity that is the same as the moving velocity of the mesh belt 122. The suction device 110 can be formed by forming an airtight box having a window having a desired size under the mesh belt 122 and by sucking gas (for example, air) through a part of the box other than the window to evacuate the box.

In the configuration described above, the defibrated fibers DF transported through the transport pipe 60 are fed into the fiber structure forming machine 100 for forming a fiber structure. The defibrated fibers DF pass through the small-hole screen on the surface of the forming drum 101 and accumulate on the first sheet (N1) on the mesh belt 122 due to the suction force applied by the suction device 110. In this process, it is possible to form a fibrous web by accumulation of the defibrated fibers DF formed into a uniform sheet-like shape on the first sheet (N1) while the mesh belt 122 and the first sheet (N1) are moved. The deposit (fibrous web) (S) formed by accumulation of the defibrated fibers DF is heated and pressed to be formed into a fiber structure having a sheet-like shape.

In the fiber structure forming machine 100, the density of the fiber structure to be completed is determined by the amount of the defibrated fibers DF to be accumulated and by a subsequent pressing process. For example, the defibrated fibers DF are accumulated to a height of approximately 40 to 60 mm in order to obtain a fiber structure having, for example, a thickness of 10 mm and a density of approximately 0.1 to 0.15 $g/cm^3$.

In the present embodiment, for the purpose of mixing the melting-resin fibers and the fire retardant into the defibrated fibers DF transported through the transport pipe 60, the melting-material transport pipe 61 and the functional-material transport pipe 62, through which the respective materials are supplied separately, are coupled to the transport pipe 60. However, the melting material and the functional material may be mixed, and the materials after the mixing may be supplied through one transport pipe coupled to the transport pipe 60 through which the defibrated fibers DF are transported. Such a transport pipe may be provided in the fiber structure forming machine 100. If such a configuration is adopted, for example, the melting-resin fibers and the fire retardant whose amounts are metered are mixed in the forming drum 101.

In addition, it is possible to impart incombustibility to the formed fiber structure (S) sheet by providing a liquid atomizer 130 and by adding a water-soluble fire retardant functioning as a functional material (for example, APINON-145 manufactured by SANWA CHEMICAL CO., LTD.) to liquid atomized by the liquid atomizer 130.

A second sheet (N2) is supplied from a second sheet supply roller 92 to a subsequent process after the fiber structure forming machine 100 and the liquid atomizer 130. The second sheet (N2) supplied from the second sheet supply roller 92 becomes a cover of an upper surface (second surface) of the defibrated-cotton sheet (fibrous web) (S) formed by the fiber structure forming machine 100.

Both woven fabric and nonwoven fabric can be used as the second sheet (N2) in the present disclosure. In the present embodiment, similarly to the first sheet (N1), ecule (registered trademark) 3151A, which is a polyester filament nonwoven fabric manufactured using a spunbonding method by TOYOBO CO., LTD., is used as the second sheet (N2).

In the present embodiment, the first sheet (N1) is supplied from the first sheet supply roller 91 to the fiber structure forming machine 100, and, after the defibrated-cotton sheet (fibrous web) (S) is formed on the first sheet (N1), the second sheet (N2) is supplied from the second sheet supply roller 92 so as to cover the upper surface of the defibrated-cotton sheet (fibrous web) (S). Instead of these steps of the present embodiment, the following steps may be adopted. The first sheet supply roller 91 and the second sheet supply roller 92 are provided in a section after (downstream of) the fiber structure forming machine 100. The defibrated-cotton sheet (fibrous web) (S) formed by the fiber structure forming machine 100 is then sandwiched between the first sheet (N1) and the second sheet (N2).

The defibrated-cotton sheet (fibrous web) (S) whose second surface is covered by the second sheet (N2) supplied from the second sheet supply roller 92 arrives at a hot pressing section.

The defibrated-cotton sheet (fibrous web) (S) is transported to a heating-and-pressing mechanism 150. The heating-and-pressing mechanism 150 sandwiches the defibrated-cotton sheet (fibrous web) (S), which is a transported object, between a first substrate 151 and a second substrate 152 configured to move up and down, and performs hot pressing through which the defibrated-cotton sheet (fibrous web) (S) is simultaneously heated and pressed. Each of the first substrate 151 and the second substrate 152 includes a built-in heater. With this configuration, it is possible to heat the sheet sandwiched between the first substrate 151 and the second substrate 152.

The defibrated-cotton sheet (fibrous web) (S) is pressed and heated by the heating-and-pressing mechanism 150. As a result, the melting material mixed in the defibrated-cotton sheet (fibrous web) (S) is heated and becomes bonded tightly to the defibrated fibers DF. This contributes to keeping the strength and shape of the fiber structure and to preventing dispersion of fibers from the fiber structure.

In addition, due to the melting and solidifying of the melting material, the first sheet (N1) becomes bonded to the defibrated-cotton sheet (fibrous web) (S) on the first surface of the defibrated-cotton sheet (fibrous web) (S), and the second sheet (N2) becomes bonded to the defibrated-cotton sheet (fibrous web) (S) on the second surface of the defibrated-cotton sheet (fibrous web) (S).

Moreover, pressing and heating in the heating-and-pressing mechanism 150 makes it possible to further increase the strength of the defibrated-cotton sheet (fibrous web) (S), as the produced fiber structure.

Although the heating process and the pressing process may be performed separately, it is preferable to simultaneously heat and press the material. Preferably, heating time should be long enough for the rising of temperature so as to cause the melting of the melting fibers near the cores of the material. Since heating and pressing is a batch process, in order to secure sufficient heating time, it is preferable to provide a buffer in a section before the heating-and-pressing mechanism 150. The buffer can be realized by moving up and down a so-called dancer roller (bridge roller). The buffer may be provided in a section before the supply of the second sheet (N2).

After the completion of heating and pressing, it is necessary to move the heated-and-pressed fiber structure quickly and then set the next material to be heated and pressed. For this purpose, it is preferable to provide a mechanism for inserting a crochet needle into the exit of the heating-and-pressing process to hold and draw out the heated-and-pressed fiber structure. More preferably, the mechanism may have a cleaning function because there is a possibility of adhesion of fibers to the heating-and-pressing surfaces. For example, it is conceivable to use a method of reeling a sheet made of polytetrafluoroethylene (PTFE), etc. at predetermined time intervals. When the apparatus is not in operation, the heating-and-pressing mechanism is retracted by moving in a direction intersecting with the transport direction.

In the present embodiment, the heating-and-pressing mechanism 150 is made up of the first substrate 151 and the second substrate 152 configured to move up and down. However, the heating-and-pressing mechanism 150 may be made up of heating-and-pressing rollers. Since heating-and-pressing rollers make it possible to perform continuous forming, no buffer is necessary.

A sheet of the fiber structure (M) obtained through the recycling process described above is cut into a desired size and shape by a cutter 160. The cut sheets are stacked as a whole fiber structure on, for example, a stacker 170 and are cooled. For example, an ultrasonic cutter can be preferably used as the cutter 160. Cutting by such an ultrasonic cutter may be performed in a width direction of the fiber structure or may be performed reciprocally in one direction and the other direction that is the opposite of the one direction along the width direction. A rotary cutter or an octagonal rotary cutter may be used instead of an ultrasonic cutter. A whole fiber structure is then cut with, for example, a Thomson die and is formed into a desired size and shape to form the recycled fiber structure (M). The recycled fiber structure (M) can be suitably used as, for example, sound-absorbing materials, which absorb sound, cushioning materials (packing materials), which absorb shocks (external force), and materials for forming dies, etc.

In the fiber structure forming machine 100 according to the present embodiment described above, since the screw feeder 80 according to the present embodiment is used for transportation when a melting material, a functional material, etc. is mixed with the defibrated fibers DF, the melting material or the functional material inside the hopper 81 is lifted up by the blade portion 83b of the screw 83, is disentangled and is not compressed, and falls smoothly through the clearance between the hopper 81 and the screw 83; therefore, it is possible to continuously transport an almost constant amount of the melting material or the functional material into the material transport pipe 82 (the melting-material transport pipe 61 or the functional-material transport pipe 62). Then, it is possible to supply a melting resin as the melting material or a fire retardant as the functional material continuously at a ratio of such an almost constant amount from the material transport pipe 82 to the transport pipe 60. Therefore, the melting material and the functional material are mixed with the defibrated fibers DF, which are transported through the transport pipe 60, continuously at a ratio of such an almost constant amount. For this reason, it is possible to form a defibrated-cotton sheet (fibrous web) in a state of uniform mixture of the melting material and the functional material with the defibrated fibers DF at the fiber structure forming machine 100. Consequently, it is possible to improve the quality of a fiber structure.

Although the screw feeder 80 is applied to the material supply apparatus 80 of the fiber structure forming machine 100 in the present embodiment, it may be applied to the part of the hopper 12 for transporting waste paper shredded into coarsely crushed pieces (paper pieces) having the size of several centimeters square to the defibrating process.

The embodiments shall not be construed to unduly limit the scope of the present disclosure. Namely, although the embodiments contain specific detailed explanations for the purpose of showing examples, a person skilled in the art will understand that various variations and modifications can be applied to the detailed content without going beyond the scope of the present disclosure. Therefore, exemplary embodiments of the present disclosure are described above without impairing the generality of the claimed aspects of the disclosure and without adding any limitation thereto.

What is claimed is:

1. A fiber structure manufacturing apparatus, comprising:
a dry defibrator that pulverizes and defibrates a raw material that contains fibers;
a transportation unit that transports a defibrated material after defibration by the dry defibrator;
a material supply unit that supplies a material to the transportation unit;
a fiber structure forming unit that forms a fiber structure from the defibrated material transported by the transportation unit, wherein
the material supply unit includes
a case that includes a material putting-in portion through which a fluff material is put in and a material putting-out portion through which the fluff material is put out below the material putting-in portion; and
a screw that includes a rotational shaft and a blade portion, the rotational shaft being provided rotatably inside the case, the blade portion being spirally mounted on the rotational shaft; wherein
the screw is rotated with repeated alternation of a slope-down direction in which the blade portion slopes downward spirally in a vertical direction and a slope-up direction in which the blade portion slopes upward spirally in the vertical direction.

2. The fiber structure manufacturing apparatus according to claim 1, wherein a length of time of rotating the screw in the slope-up direction is greater than a length of time of rotating the screw in the slope-down direction.

3. The fiber structure manufacturing apparatus according to claim 1, wherein
the material supply unit further includes a jet ejector that projects a jet of gas to an inside of the case.

4. The fiber structure manufacturing apparatus according to claim 1, wherein
the material supply unit further includes a stirring member that stirs an inside of the case.

5. The fiber structure manufacturing apparatus according to claim 1, wherein
a diameter of the blade portion becomes larger toward a top.

* * * * *